(12) United States Patent
Scott

(10) Patent No.: US 7,182,679 B2
(45) Date of Patent: Feb. 27, 2007

(54) CONICAL POINT SHARPENER

(76) Inventor: William S. Scott, 3700 X St. PMB 26, Vancouver, WA (US) 98663

( * ) Notice: Subject to any disclaimer, the term of this patent is extended or adjusted under 35 U.S.C. 154(b) by 0 days.

(21) Appl. No.: 11/442,466

(22) Filed: May 25, 2006

(65) Prior Publication Data

US 2006/0277816 A1  Dec. 14, 2006

Related U.S. Application Data

(60) Provisional application No. 60/685,123, filed on May 27, 2005.

(51) Int. Cl.
*B24B 19/00* (2006.01)
(52) U.S. Cl. .................. 451/367; 451/404; 451/555; 451/558
(58) Field of Classification Search ........ 451/367–370, 451/375, 404, 460, 462, 552, 555, 557, 558, 451/48
See application file for complete search history.

(56) References Cited

U.S. PATENT DOCUMENTS

| | | | |
|---|---|---|---|
| 2,426,892 A * | 9/1947 | Mayer | 451/558 |
| 2,657,503 A | 11/1953 | Gaines | |
| 2,766,644 A | 10/1956 | Marks | |
| 3,468,068 A | 9/1969 | Spruell | |
| 3,718,938 A * | 3/1973 | Blume | 7/106 |
| 3,735,542 A * | 5/1973 | Kocian | 451/461 |
| 4,069,528 A * | 1/1978 | Newton et al. | 7/170 |
| 4,635,406 A * | 1/1987 | Rumbaugh | 451/461 |
| 4,852,305 A | 8/1989 | Juranitch | |
| 4,991,355 A * | 2/1991 | Giles | 451/211 |
| 5,172,523 A | 12/1992 | Kadlec | |
| 5,287,661 A | 2/1994 | Benner | |
| 5,735,071 A | 4/1998 | Gouldie | |
| 5,967,888 A | 10/1999 | Lawhun | |

* cited by examiner

*Primary Examiner*—Dung Van Nguyen
(74) *Attorney, Agent, or Firm*—Kurt M. Rylander

(57) ABSTRACT

A conical point sharpener for sharpening conical shaped points such as fishhooks, needles, surgical instruments includes a handle, a mandril with an abrasive material coating fixed to one end of said handle, a drive spindle, wherein said drive spindle is movably attached to said handle and envelops said mandril, an outwardly protruding tapered opening on said drive spindle, and a precision point alignment nest, formed between said abrasive material coating on said mandril and said drive spindle, such that when the conical point to be sharpened is placed in said outwardly protruding tapered opening of said drive spindle, the item to be sharpened is located in said precision point alignment nest and the point of the item is touching said abrasive material coating on said mandril so that the user can then rotate said drive spindle while holding the item to be sharpened, thereby conically sharpening the point as the item to be sharpened rotates around said mandril.

14 Claims, 6 Drawing Sheets

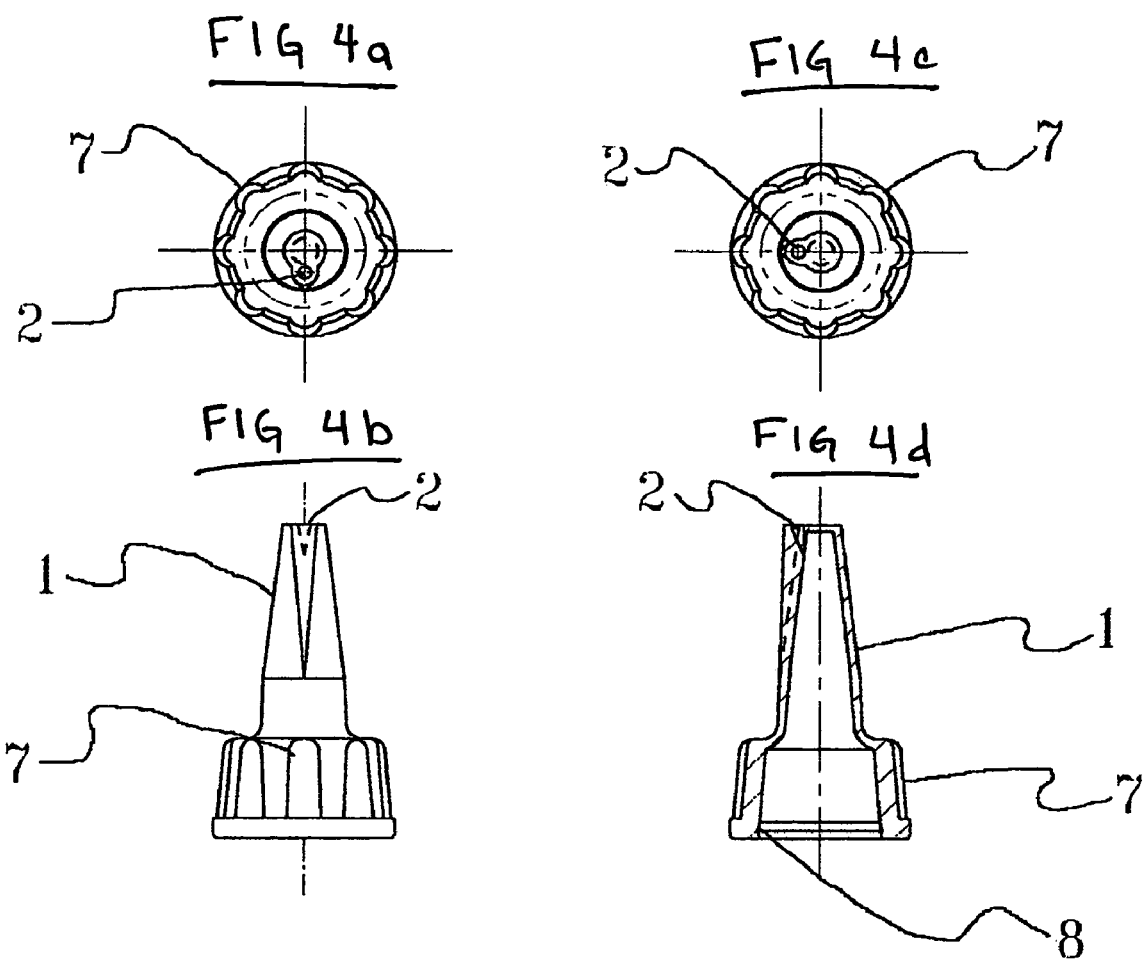

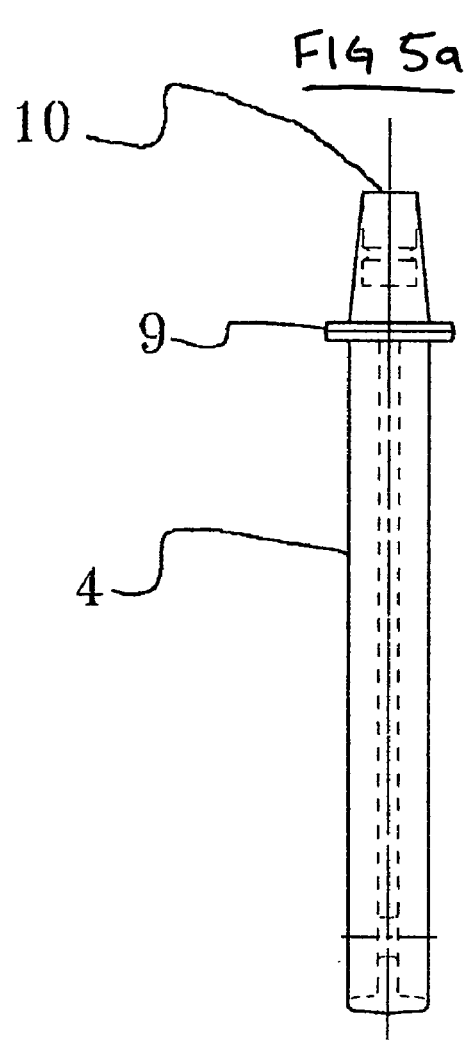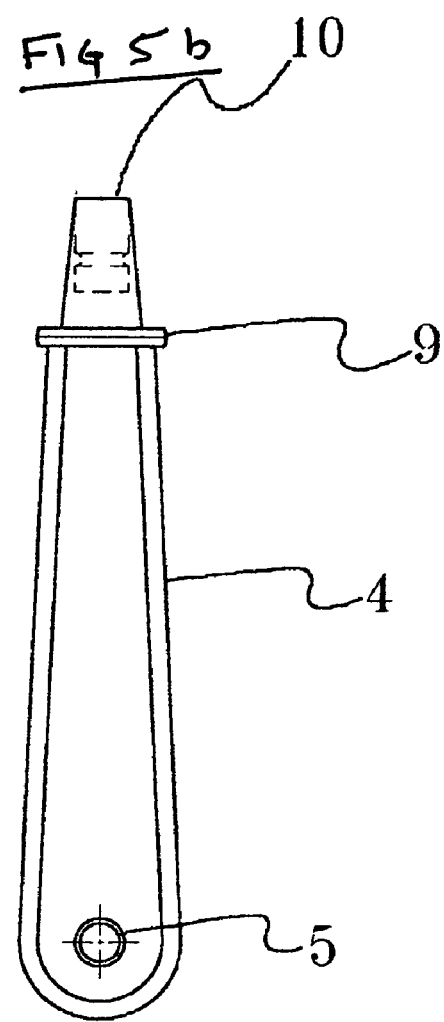

CONICAL POINT SHARPENER

CROSS-REFERENCE TO RELATED APPLICATION

This application is a nonprovisional of and claims priority to co-pending provisional Application Ser. No. 60/685,123, filed May 27, 2005.

FIELD OF INVENTION

The present invention relates to conical point sharpeners, and more specifically to methods and devices for sharpening objects with conically shaped points such as fishhooks, sewing and quilting needles, darts, medical interments, and surgical tools.

BACKGROUND OF THE INVENTION

Fishermen require sharp hooks to properly snare a fish. An existing problem for fishermen occurs when fishing hooks became dull over time and/or from repeated use, causing the fishhook to not properly hook into the back, bony part of a fish's mouth. Consequently, the fish can pull away from the hook and be lost. Previous options to included fishhook sharpeners with a tapered recess but a flat bottom, which can result in the point of the hook hitting the bottom of the tapered recess thereby dulling the hook point. Another option was to use a fishhook sharpener with a "V-shaped" groove.

In addition to the creating, or re-sharpening of conical points on various items needing a needle sharp conical point such as sewing and medical tools, and various fine pointed articles as described herein. One of the primary intended uses for the present invention is the point maintenance of fishhooks. A dull hook is the single biggest reason angler's loose fish. A dull hook won't set in the bony area at the back of the fish's mouth. It can slide forward as you try to set the hook, into the soft front portion of its mouth where the soft tissue can tear and allow the hook to pull out. The results are a lost fish.

The relevant art reviewed all have a common thread running through them that keeps them from hitting the mark. This common thread is choice and use of the wrong materials for the application, and over-complexity of mechanical design. Another fact is that more modern materials and processes are now available to improve the development and design of a device and methods for the creating and sharpening of conical points as described herein. A number of devices have provided fishermen with the ability to sharpen fishing hooks, but lack the tapered sharpener and simplicity of the present invention. Presently known art attempts to address this problem, but has not completely solved the problem.

The following represents a list of known related art:

| Reference: | Issued to: | Date of Issue: |
| --- | --- | --- |
| U.S. Pat. No. 3,468,068 | Spruell | Sep. 23, 1969 |
| U.S. Pat. No. 4,991,355 | Giles | Feb. 12, 1991 |
| U.S. Pat. No. 2,426,892 | Mayer | Sep. 2, 1947 |
| U.S. Pat. No. 2,766,644 | Marks | Oct. 16, 1956 |
| U.S. Pat. No. 4,635,406 | Rumbaugh | Jan. 13, 1987 |
| U.S. Pat. No. 5,735,071 | Gouldie | Apr. 7, 1998 |
| U.S. Pat. No. 5,172,523 | Kadlec | Dec. 22, 1992 |
| U.S. Pat. No. 5,287,661 | Benner | Feb. 22, 1994 |
| U.S. Pat. No. 5,967,888 | Lawhun | Oct. 19, 1999 |
| U.S. Pat. No. 4,852,305 | Juranitch | Aug. 1, 1989 |
| U.S. Pat. No. 2,657,503 | Gaines | Nov. 3, 1953 |

The teachings of each of the above-listed citations (which does not itself incorporate essential material by reference) are herein incorporated by reference. None of the above inventions and patents, taken either singularly or in combination, is seen to describe the instant invention as claimed.

Disadvantages of these prior art point and fishhook sharpeners are the design of how the abrasive surface is presented to the point to be sharpened and the choice of abrasive materials (E.G. U.S. Pat. No. 2,426,892 FIGS. 3 AND 4 CROSS SECTIONAL VIEWS 6–6 AND 13–14) as shown in the cross sectional view 6–6 of the tapered recess used to receive the hook point for sharpening. With continued use the tapered recess will shortly abrade into a shape unable to support the sharpening process by allowing the point of the hook to hit the bottom of the tapered recess, thus dulling the hook point. In addition, my tests have concluded that the use of an abrasive material as claimed in this prior art will breakdown very quickly thus preventing the creation of a clean, sharp, crisp point. Prior art (E.G. U.S. Pat. No. 2,766,644 FIGS. 3 AND 4) demonstrates how critical material choice is in designing a device to dress, or sharpen, a point on a fishhook or other object. This prior art is using a course file section held in place against a "V" groove creating an inwardly extending slot having a tapered opening in which to place the fishhook point for sharpening. The problem with this design is the course file or abrasive section will create grooves in the fishhook causing stress fractures and failure under load conditions. Additionally, the "V" groove and abrasive plate relationship create a pinch point that will not allow the point to sharpen fully and will pinch, grip, and twist off the thin hook point as it is formed. Also, there is no provision for the expulsion of metal and abrasive particles, and broken tips as they are generated by the hook sharpening device and process, while it is in use, and will further impede the successful sharpening of the fishhook. The use of an abrasive conical socket is demonstrated in (E.G. U.S. Pat. No. 3,468,068 FIGS. 1, 2, 3, 5 AND 6) in an attempt to create a method of sharpening a fishhook point. The actual results will be the creation of a dull fishhook. There is nothing in this prior art that prevents the hook point from rubbing on the bottom of the conical socket. Therefore, if a new fishhook were put through the sharpening process using this device it would be duller after the process than before using this device. Additionally, in (FIG. 5) the complexity of design will create very expensive manufacturing costs for the task that it is capable of performing.

Ease of use issues requiring good eye and hand coordination along with a stable platform, can have a negative impact on the results of attempting to sharpen a point on a fishhook without having a proper guide for the hook (E.G. U.S. Pat. No. 4,635,406 FIG. 1, ITEMS No. 14 AND 36) showing the interface with the hook and rotating stone having no guide for the fishhook. In addition, there is a safety issue involved with this design whereas the unguarded rotating abrasive stone can cut the fingers of a person holding the fishhook or other object if they slip or misjudge the contact of the object being sharpened and the rotating abrasive slug. As shown in (E.G. U.S. Pat. No.

5,735,071 FIG. 1, ITEM 68) an abrasive stone has been attached to the protective cap of this device with the intended use of sharpening a fishhook. Again, the use of this prior art requires a high degree of eye and hand coordination and will not produce a tapered conical point.

Other drawbacks to following the concepts offered in much of the prior art, is the limited ability of these devices to match the manufactured angle of the hook point (E.G. U.S. Pat. No. 5,172,523 FIG. 1, ITEMS 10 AND 100) this prior art offers a flat sharpening surface to a conical point, giving limited ability to match the angle of the hook point and can not duplicate the conical point of the hook by sharpening all 360 degrees of the point, thus creating a flat spot on the hook and a spade or shovel point on the hook point, which reduces the hook's ability to easily penetrate the fish's mouth. Another example of this condition is offered in (E.G. U.S. Pat. No. 5,287,661 FIGS. 3 AND 5, ITEMS No. 32 AND 14) where it demonstrates that it is not possible to create a conical point with this prior art. At best, a spade shaped point would be generated because of the ability of this device to only contact one tangent point on a flat surface, whereas it creates a flat surface that had previously been a conical tapered surface coming to a sharp point. Additionally, this prior art not having the ability to sharpen one point at a time, any bent hook, not matching the manufactured angle of this device can not be sharpened.

Portability, and ease of use, of a point or fishhook maintenance or sharpening device, is of critical importance to the user when out in the wilds or in a rocking boat fishing. (E.G. U.S. Pat. No. 5,967,888 FIG. No. 2 ITEMS 1 AND 10) Shows a device that is not easily portable for in the field sharpening of hooks. This fishhook sharpening device uses a vice like clamping system and a separate sharpening stone, requiring a high degree of eye hand coordination skills and a stable surface to set this device on for use. It is large in size, and unsafe to use in a rocking boat or harsh environments, because of the danger of your hand slipping and being jabbed by the stationary clamped hook point and barb. The apparatus shown in the prior art (E.G. U.S. Pat. No. 4,852,305 FIG. Nos. 5, 6, 9, AND 12) also shows a device that is not easily portable for in the field sharpening of hooks. In addition to being a very complicated device, requiring the use of additional tools in order to sharpen a point on a fishhook, Its complexity makes it a very expensive product to manufacture, and if used in a saltwater or damp environment will be subject to rusting and if neglected will shortly become unusable.

Prior art complexity of design and material use are critical elements to consider in today's economy as it relates to manufacturing costs along with the current competitive nature of offshore manufacturing. In the prior art (E.G. U.S. Pat. No. 2,657,503 FIG. Nos. 2, 3, AND 8) we are shown a fishhook sharpener device of extreme complexity and yet it cannot dress a conical, tapered point, it can only sharpen one surface area of the hook producing a spade or shovel point. The fact that it is a machined assembly makes the manufacturing costs prohibitive in today's economy. Additionally, if used in a saltwater or damp environment it will be subject to rusting and if neglected will shortly become unusable. The additional prior art (E.G. U.S. Pat. No. 4,991,355 FIG. Nos. 1 THRU 19) Show a device capable of sharpening a conical point, using a reciprocating, rotary, abrasive element battery and motor driven around a stationary held fishhook. This device is another example of a product that is extremely expensive to manufacture. In addition, it requires batteries to operate this device, which adds additional costs to the customer, and if you are out in the field and the batteries go dead you cannot sharpen your fishhooks.

In summary, the reviewed prior art commented on herein, employs designs and materials that limit their application to devices that are marginal at best in there performance, operation, and in some cases useful product life. In other cases the materials available at the time or selected, along with the manufacturing methods chosen, were not a good match for the device, or the design was limited by the knowledge and experience of the inventor. The wrong materials for the application and over complexity of mechanical design for the desired application can make a product undesirable for manufacturing because of cost, or design appearance, and esthetics. The application of state of the art materials, engineering methods and improved manufacturing methods as applied to the present invention, and described herein will overcome the failings of the reviewed prior art, to create an improved design of a device and methods for the creating and sharpening of conical points as described herein.

SUMMARY AND ADVANTAGES

A conical point sharpener for sharpening devices with conically shaped points such as fishhooks, sewing and quilting needles, darts, medical interments, and surgical tools includes includes a handle, a mandril with an abrasive material coating fixed to one end of said handle, a drive spindle, wherein said drive spindle is movably attached to said handle and envelops said mandril, an outwardly protruding tapered opening on said drive spindle, and a precision point alignment nest, formed between said abrasive material coating on said mandril and said drive spindle, such that when the conical point to be sharpened is placed in said outwardly protruding tapered opening of said drive spindle, the item to be sharpened is located in said precision point alignment nest and the point of the item is touching said abrasive material coating on said mandril so that the user can then rotate said drive spindle while holding the item to be sharpened, thereby conically sharpening the point as the item to be sharpened rotates around said mandril.

The conical point sharpener of the present invention presents numerous advantages, including: (1) accuracy in sharpening conical points without damaging the point, (2) precision in sharpening conical points, (3) portability, (4) simplicity of mechanical parts, (5) protect the user from the sharp point during sharpening, and (6) ease of use in an unstable environment, such as on a fishing boat; (7) easily fit within a vest pocket or shirt; (8) able to withstand a harsh, wet, or saltwater environment and remain useable; (9) hand held; and, among others, (10) does not require motor or batteries.

Additional advantages of the invention will be set forth in part in the description which follows, and in part will be obvious from the description, or may be learned by practice of the invention. The advantages of the invention may be realized and attained by means of the instrumentalities and combinations particularly pointed out in the appended claims. Further benefits and advantages of the embodiments of the invention will become apparent from consideration of the following detailed description given with reference to the accompanying drawings, which specify and show preferred embodiments of the present invention.

BRIEF DESCRIPTION OF THE DRAWINGS

The accompanying drawings, which are incorporated into and constitute a part of this specification, illustrate one or more embodiments of the present invention and, together with the detailed description, serve to explain the principles and implementations of the invention.

FIGS. 4a–d shows side and top views of the drive spindle with one view in cross section.

FIGS. 5a, b shows a front and side view of the handle component.

DETAILED DESCRIPTION

Before beginning a detailed description of the subject invention, mention of the following is in order. When appropriate, like reference materials and characters are used to designate identical, corresponding, or similar components in differing figure drawings. The figure drawings associated with this disclosure typically are not drawn with dimensional accuracy to scale, i.e., such drawings have been drafted with a focus on clarity of viewing and understanding rather than dimensional accuracy.

In the interest of clarity, not all of the routine features of the implementations described herein are shown and described. It will, of course, be appreciated that in the development of any such actual implementation, numerous implementation-specific decisions must be made in order to achieve the developer's specific goals, such as compliance with application- and business-related constraints, and that these specific goals will vary from one implementation to another and from one developer to another. Moreover, it will be appreciated that such a development effort might be complex and time-consuming, but would nevertheless be a routine undertaking of engineering for those of ordinary skill in the art having the benefit of this disclosure.

Referring in detail to the drawings showing a conical point sharpener for sharpening conical shaped points such as fishhooks, needles, surgical instruments includes a handle, a mandril with an abrasive material coating fixed to one end of said handle, a drive spindle, wherein said drive spindle is movably attached to said handle and envelops said mandril, an outwardly protruding tapered opening on said drive spindle, and a precision point alignment nest, formed between said abrasive material coating on said mandril and said drive spindle, such that when the conical point to be sharpened is placed in said outwardly protruding tapered opening of said drive spindle, the item to be sharpened is located in said precision point alignment nest and the point of the item is touching said abrasive material coating on said mandril so that the user can then rotate said drive spindle while holding the item to be sharpened, thereby conically sharpening the point as the item to be sharpened rotates around said mandril.

Figure 1:
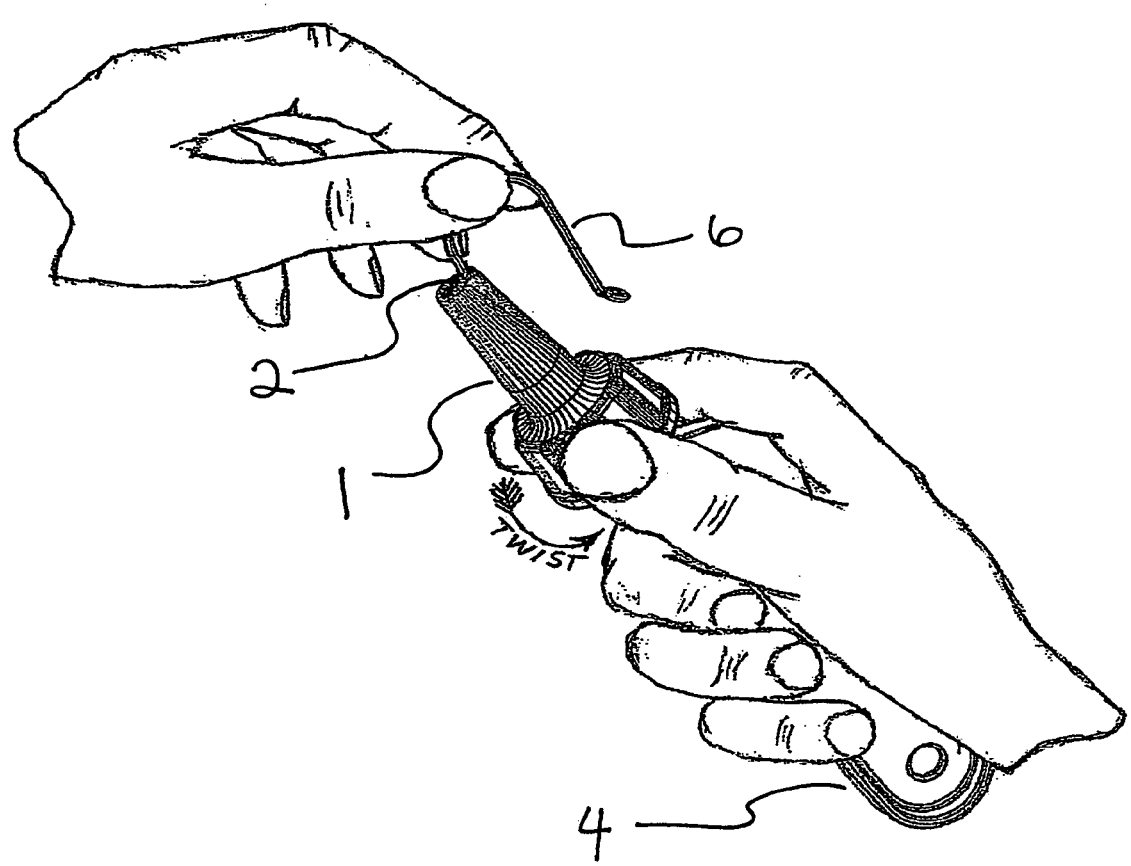
FIG. 1 is a perspective view showing the use of the device.

In FIG. 1 shown in its simplest form, the present invention in use, and showing a fishhook 6, for example, in position in the drive spindle 1, located in the precision point alignment nest 2, while the device's handle 4 is held in one hand, and the drive spindle 1 is twisted in either direction with the thumb and forefinger of the same hand, while holding the fishhook 6 and allowing it to move in a planetary type orbit around the stationary abrasive mandril 3 precisely located within the drive spindle 1, thus producing a sharpened conical point.

Figure 2:
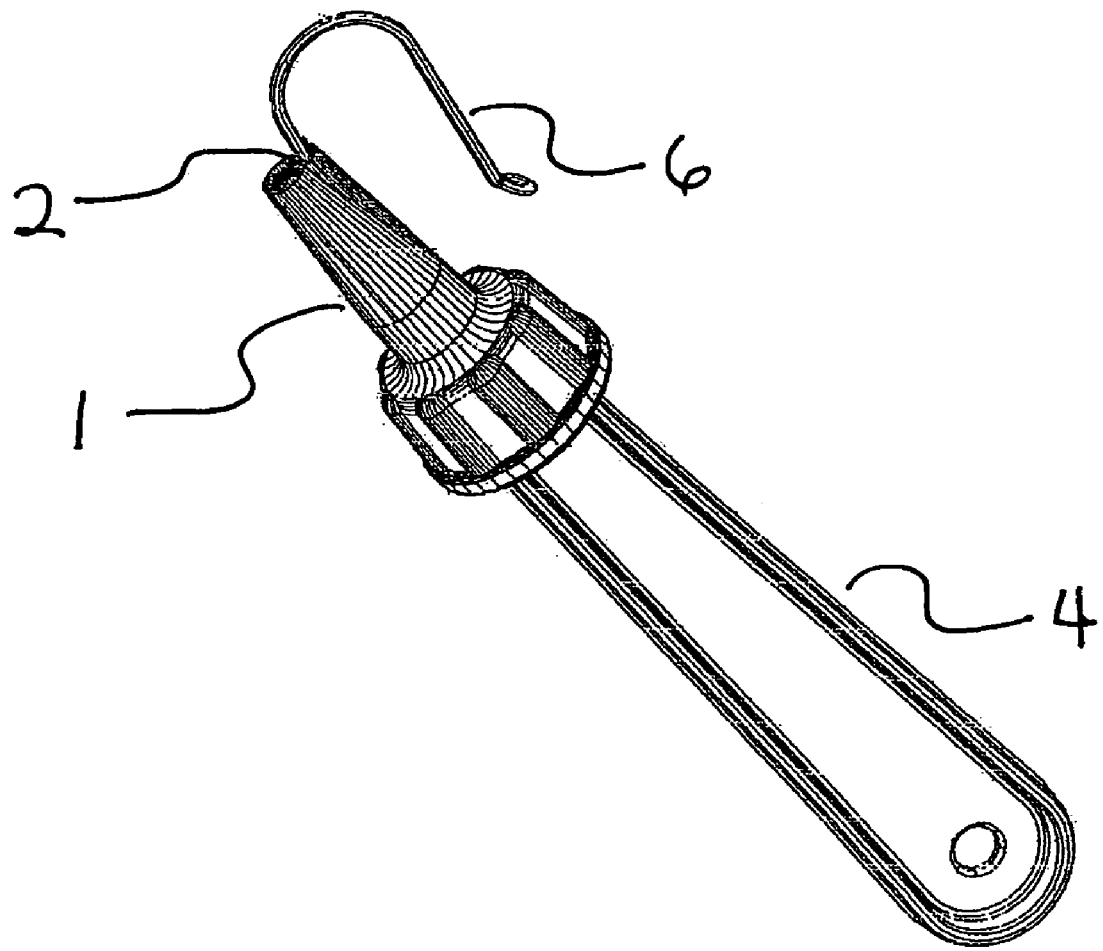
FIG. 2 is a perspective view of the device showing a fishhook positioned in the drive spindle's alignment nest.
Figure 3:
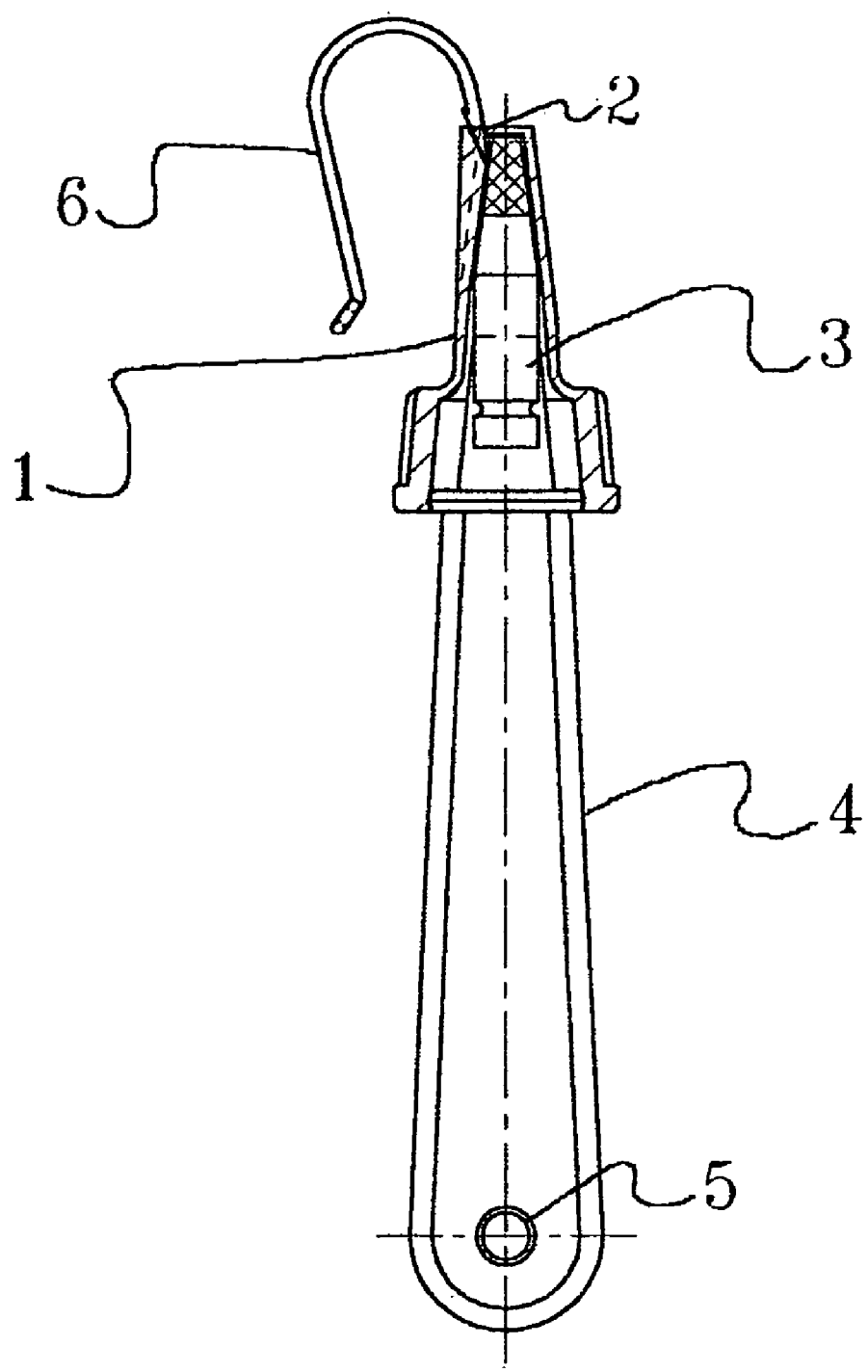
FIG. 3 is a side view showing a fishhook and the device assembly with the drive spindle in cross section and the mandril in partial phantom within the handle.

In use the point of an object, for example a fishhook 6, to be sharpened is inserted parallel to its axis, and into the precision angled point alignment nest 2, as shown in FIGS. 1, 2, and 3, while the operator holds the hook at its crown, and in place with the thumb and forefinger of the right or left hand while keeping a slight downward pressure as shown in FIG. 1. The operator grips and holds the handle portion of the device 4 at the opposite end of the drive spindle 1, with the other hand as between the palm and third and fourth fingers as shown in FIG. 1. With the thumb and forefinger of this same hand the operator rotates the drive spindle 1 in either direction. The rotation action of the drive spindle 1 causes the affixed, off set, precision angled point alignment nest 2, integral with the drive spindle 1, to rotate the fishhook 6 in a planetary type orbital movement around the rigidly affixed abrasive mandril 3, held stationary by being captured within the device handle's 4, mandril socket 10. The rotary, orbital movement causes the point of the hook or object, to proceed in an orbital movement around the precision angled, stationary abrasive surface 11, thus grinding, honing, or sharpening it to a needle sharp conical point.

The present invention, a device for producing and sharpening conical shaped points on fishhooks, darts, needles, medical tools and the like, includes a drive spindle 1; a precision abrasive coated mandril 3; and a device handle 4; as shown in FIG. 3.

A basic embodiment of the present invention shown herein in its simplest form, but not restricted to a manually operated model only, built according to the structure, materials and methodology described herein, is a device for producing and sharpening conical shaped points. It comprises a system not limited to, but in its simplest form of three major interrelated components shown in FIG. 3, drive spindle 1 having a precision alignment nest 2, abrasive mandril 3, and handle 4, that when aligned in a precision embodiment and using the key element of orbital movement of the object to be sharpened around a stationary or possibly rotating in a more complex form, precision abrasive surface, will with fewer components, state of the art materials and a simpler design, create a device and method of use that is an improvement over prior art heretofore used to accomplish this task. The present art comprises a system of components: FIGS. 4a–d, 1 a drive spindle with precision point alignment nest 2, knurl or gripping lugs 7, and bearing race 8, FIGS. 5a–b, 4 a device handle having a bearing surface 9, and a abrasive mandril socket 10, FIG. 6, 3 a mandril with abrasive coated surface 11, precision presentation angle 12, and mandril locking groove 13.

The drive spindle 1, as seen in FIGS. 3 and 4a–d, is constructed from a suitable injection molding plastic material that is molded in a suitably constructed plastic injection mold for use in the plastic injection molding process.

Figure 6:
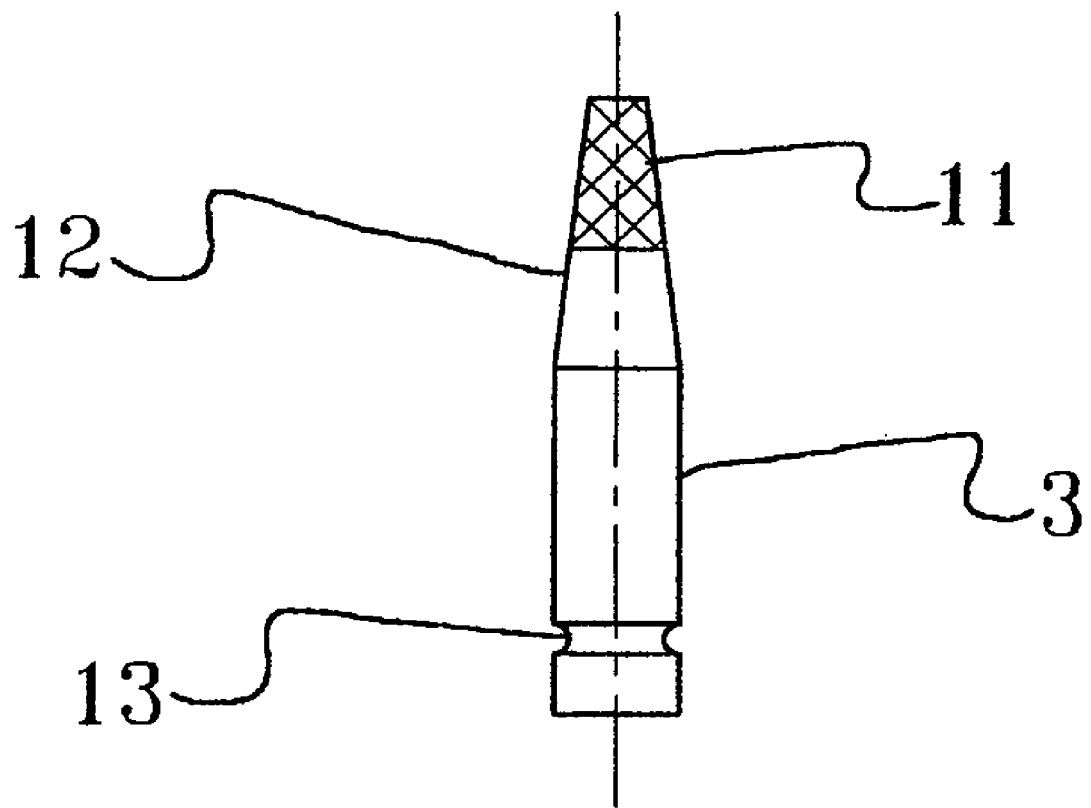
FIG. 6 is a side view of the sharpening mandril showing the abrasive coating location.

The design elements of the drive spindle 1, consist of the main body FIGS. 3 and 4, 1 having a precision point alignment nest 2, that enjoys a strict angular relationship with the FIGS. 3 and 6, mandril's 3, precision presentation angle 12, to create the proper compound angle to create a precise conical point on FIG. 3, fishhook 6 or like object to be sharpened. The FIGS. 4a–d, drive spindle 1, additionally having an integral bearing race 8, molded into its main body 1, being so dimensioned as to create a snap fit assembly with the proper clearance between the bearing race 8 and the FIGS. 5*a*–*b*, device handle's 4, bearing surface 9 to create a free running fit for easy rotation with the fingers.

The mandril 3, as seen in FIGS. 3 and 6, is constructed from a free machining metal material suitable for screw machining, or other manufacturing processes capable of producing this configuration in a economically efficient manner, and capable of receiving the application of FIG. 6, abrasive coated material 11. The FIG. 6, mandril 3, also having a precision presentation angle 12, to create the exact angular relationship with the FIGS. 4*a*–*d*, precision point alignment nest 2, to create the proper compound angle between the FIG. 3, fishhook's 6 point, the drive spindle's 1, precision point alignment nest 2, and FIG. 6, precision presentation angle 12, having applied to it a suitable abrasive coated material 11 engaged, or rubbed against, to create a needle sharp, conical point on FIG. 3, fishhook 6, or like object to be sharpened when it has been rotated 360 degrees of orbital rotation around mandril 3. In addition, the mandril 3, as seen in FIGS. 3 and 6, contains the further element of a FIG. 6, mandril-locking groove 13, when mandril 3 has been molded or assembled in place within the structure of FIGS. 5*a*–*b*, device handle's 4, abrasive mandril socket 10, the mandril 3 is locked in place in its simplest form and becomes stationary being prevented from any movement. In a more complex form, the mandril 3 may have the ability to counter rotate to the direction of movement of spindle1.

The device handle 4, as seen in FIGS. 3 and 5*a*–*b*, is constructed from a suitable injection molding plastic material that is molded in a suitably constructed plastic injection mold for use in the plastic injection molding process, although other materials may be substituted to construct a suitable device handle as desired.

The design elements of the device handle 4, consist of the FIGS. 5*a*–*b*, handle area 4, having a suitable designed shape and structure to facilitate the ease of use, holding, gripping and operation of the present invention, having a receptacle hole for a lanyard 5, of suitable size and location for convenient use by the operator. Integral with, affixed to, and molded into or otherwise created on the device handle 4, is a bearing surface 9, being so dimensioned as to create a snap fit assembly with the proper clearance between the bearing surface 9, and the FIGS. 4*a*–*d*, drive spindle's 1, bearing race 8, creating a free running fit for ease of rotation with the fingers or other methods. Molded in place, or otherwise created, properly located and configured to a workable size is the FIGS. 5*a*–*b*, abrasive mandril socket 10, configured for the purpose of receiving, precisely locating, and holding in position of the FIG. 6, mandril 3, for interaction with the FIGS. 4*a*–*d*, drive spindle's 1, precision point alignment nest 2, and FIG. 3, fishhook 6.

While the description of the basic embodiment of the present invention, of a device for producing and sharpening conical shaped points, is described in detail and in its simplest form, it is only one embodiment among many possible ones. It should not be construed as a limitation on the scope of the invention but as an exemplification of one preferred embodiment thereof.

While the basic embodiment of the present invention has been disclosed in the form of a simple 3-component device for the creation or re-sharpening of conical points. However, by this point, the reader should understand that through the use of the unique elements of the present invention and methodology, that a wide variety of other embodiments could be readily developed through the use of the basic elements of this invention that could readily be modified and adapted to various other types of conical point creation and re-sharpening devices through the use of my orbital method of object movement around a stationary axis, abrasive mandril, that could be well suited for other commercial and privet use applications, in addition to fishhooks, sewing and quilting needles, darts, medical interments, surgical tools and the like including an electric motorized version. As such, the scope of the invention should not be defined by the particular embodiments herein described but should be defined only by the claims and equivalents thereof.

I claim:

1. A conical point sharpener, comprising:
   a handle;
   a mandril with an abrasive material coating fixed to one end of said handle;
   a drive spindle, wherein said drive spindle is movably attached to said handle and envelops said mandril;
   an outwardly protruding tapered opening on said drive spindle; and
   a precision point alignment nest, formed between said abrasive material coating on said mandril and said drive spindle, such that when the conical point to be sharpened is placed in said outwardly protruding tapered opening of said drive spindle, the item to be sharpened is located in said precision point alignment nest and the point of the item is touching said abrasive material coating on said mandril so that the user can then rotate said drive spindle while holding the item to be sharpened, thereby conically sharpening the point as the item to be sharpened rotates around said mandril.

2. The conical point sharpener of claim 1, further comprising:
   a bearing race integral to said drive spindle; and
   a bearing surface integral to said handle, such that said bearing race and said bearing surface attach, thereby securing said drive spindle to said handle but allowing said drive spindle to rotate.

3. The conical point sharpener of claim 1, wherein said handle is provided with a recess.

4. The conical point sharpener of claim 1, wherein said mandril further comprises a locking groove, such that said locking groove secures said mandril to said mandril socket.

5. The conical point sharpener of claim 1, wherein said drive spindle further comprises a knurl, thereby allowing the user to more easily grasp said drive spindle.

6. The conical point sharpener of claim 2, wherein said drive spindle further comprises a knurl, thereby allowing the user to more easily grasp said drive spindle.

7. A conical point sharpener, comprising:
   a handle;
   a mandril with an abrasive material coating;
   a mandril socket, attached to said handle, in which said mandril is secured;
   a drive spindle, wherein said drive spindle is movably attached to said handle and envelops said mandril;
   an outwardly protruding tapered opening on said drive spindle; and
   a precision point alignment nest, formed between said abrasive material coating on said mandril and said drive spindle, such that when the conical point to be sharpened is placed in said outwardly protruding tapered opening of said drive spindle, the item to be sharpened is located in said precision point alignment nest and the point of the item is touching said abrasive material coating on said mandril so that the user can rotate said drive spindle while holding the item to be sharpened, thereby conically sharpening the point as the item to be sharpened rotates around said mandril.

8. The conical point sharpener of claim 7, further comprising:
a bearing race integral to said drive spindle; and
a bearing surface integral to said handle, such that said bearing race and said bearing surface attach, thereby securing said drive spindle to said handle but allowing said drive spindle to rotate.

9. The conical point sharpener of claim 7, wherein said handle is provided with a recess.

10. The conical point sharpener of claim 7, wherein said mandril further comprise a locking groove, such that said locking groove secures said mandril to said mandril socket.

11. The conical point sharpener of claim 7, wherein said drive spindle further comprises a knurl, thereby allowing the user to more easily grasp said drive spindle.

12. The conical point sharpener of claim 8, wherein said drive spindle further comprises a knurl, thereby allowing the user to more easily grasp said drive spindle.

13. A conical point sharpener, comprising:
a suitably shaped handle portion having a mandril receiving socket formed at one end and a lanyard receiving hole at the opposite end, and carried fixedly at the top end of said handle portion and located below the mandril receiving socket formed at the top end of the device handle is a bearing surface and connecting means;
a cylindrical shaped, diamond coated abrasive mandril carried fixedly in the top end of said handle portion having the mandril receiving socket for same; and
a sleeve or spindle encapsulating said cylindrical shaped, diamond coated abrasive mandril, and aligned with the center axis of said device handle and diamond coated abrasive mandril, while having a conical socket formed therein at its top end, adapted to receive the point portion of an object therein, the rotational axis of said spindle being parallel with the center axis of said cylindrical shaped, diamond coated abrasive mandril, the conical shaped socket formed therein the top end of the spindle, and adapted to receive the point portion of an object therein, is positioned offset from the spindle rotational axis to create an orbital movement and rotation around said cylindrical shaped, diamond coated abrasive mandril at a distance, the conical shaped socket formed therein and adapted to receive the point portion of an object therein, is angled and projected inwardly with its narrow or sharp, bottom portion, whereby positioned pointing in toward the center axes of the diamond coated abrasive mandril and the top, wide or open, portion of the conical shaped socket formed therein, projecting outwardly and away from the center axes of the diamond coated abrasive mandril to form the necessary compound angle required to generate precision conical points, the spindle, when rotated, causes the conical shaped socket formed therein, and adapted to receive the point portion of an object therein, and is integral with the spindle to move in an orbit around the stationary, affixed diamond coated abrasive mandril, causing the object inserted therein, to rub against the affixed diamond coated, cylindrical, abrasive mandril's presentation angle, creating a needle sharp point on the object to be sharpened, additionally, carried fixedly at the bottom end of said spindle flange's, inside surface, is a bearing race and connecting means for affixing rotationally to the device handle portion's bearing surface and connecting means.

14. The conical point sharpener of claim 13, further wherein
said handle is divided into a lower portion formed for gripping by the operator, and an upper portion carrying said affixed diamond coated abrasive mandril housed within a sleeve or spindle encapsulating, and axially aligned with said cylindrical shaped, diamond coated abrasive mandril, and center axis of said device handle;
means connecting said device handle upper portion and diamond coated abrasive mandril to permit relative axial alignment;
mandrel means having a predetermined diameter and length, with its lower portion having a interrupted surface means to affixidly fasten to the upper portion of the device handle said carrying means, the upper portion of said mandril means having a predetermined angled abrasive surface having a central axis, and said central axis of said predetermined angled abrasive surface, being coaxial with said device handle means and said sleeve or spindle means;
means rotationally connecting said device handle upper and operating sleeve or spindle portions of said device for sharpening conical shaped points, to permit relative rotation thereof about the axes of said device handle and said cylindrical shaped, diamond coated abrasive mandril; and
operating sleeve or spindle while having an integral conical shaped socket portion, the conical shaped socket formed therein and adapted to receive the point portion of an object to be sharpened therein, is angled and projected downwardly and inwardly with its narrow or sharp, bottom portion, whereby positioned pointing in toward the center axes of the diamond coated abrasive mandril, and the top, wide or open, portion of the conical shaped socket formed therein, projecting upwardly and outwardly, away from the center axes of the diamond coated abrasive mandril to form the necessary compound angle required to generate precision conical points, is positioned offset at a distance from the operating spindle centroidal rotational axis, to create an orbital, angular, rotational 360 degrees of object to be sharpened transportation movement around the outside, diamond coated abrasive mandril abrasive presentation angle surface, of said cylindrical shaped, diamond coated abrasive mandril, to create the critical blend of 360 degrees of movement, and compound angle relationship of said operational sleeve or spindle's integral conical shaped socket portion, and the said diamond coated abrasive mandril presentation angle surface, said operating sleeve or spindle also having fixedly located on the outside, lower portion of the main body of the operating spindle of sleeve, a knurl or gripping lugs to facilitate the easy gripping and rotation of said operating spindle or sleeve with the fingers or other object.

* * * * *